US007520644B2

(12) United States Patent
Jordan et al.

(10) Patent No.: US 7,520,644 B2
(45) Date of Patent: Apr. 21, 2009

(54) TRANSOM DRAIN LIGHT

(76) Inventors: Robert Jordan, 8890 SE. North Passage Way, Tequesta, FL (US) 33469; Mike Townsend, 8836 SE. North Passage Way, Tequesta, FL (US) 33469

( * ) Notice: Subject to any disclaimer, the term of this patent is extended or adjusted under 35 U.S.C. 154(b) by 207 days.

(21) Appl. No.: 11/617,328

(22) Filed: Dec. 28, 2006

(65) Prior Publication Data

US 2008/0007960 A1 Jan. 10, 2008

(51) Int. Cl.
*B60Q 1/24* (2006.01)

(52) U.S. Cl. ........................ 362/477; 362/267; 362/548; 362/800

(58) Field of Classification Search ................. 362/202, 362/477, 548, 267, 101; 441/13, 16; 340/984, 340/985
See application file for complete search history.

(56) References Cited

U.S. PATENT DOCUMENTS 4,445,163 A 4/1984 Ziaylek, Jr.
4,954,932 A * 9/1990 Isenga ........................ 362/477
D315,417 S * 3/1991 Ziaylek et al. ............... D26/28
5,045,978 A 9/1991 Gargle
5,800,041 A 9/1998 Poggi
6,115,060 A * 9/2000 Rowley ........................ 348/81
6,616,291 B1 9/2003 Love
6,883,944 B2 * 4/2005 LeBoeuf ..................... 362/477
7,044,623 B2 5/2006 Olsson et al.
7,125,146 B2 10/2006 Willis et al.
7,396,139 B2 * 7/2008 Savage ........................ 362/101
2007/0279912 A1 * 12/2007 Urquhart .................... 362/341

* cited by examiner

*Primary Examiner*—Jong-Suk (James) Lee
*Assistant Examiner*—Leah S Lovell
(74) *Attorney, Agent, or Firm*—McHale & Slavin, P.A.

(57) ABSTRACT

Disclosed is an underwater lighting apparatus securable in the transom drain hole of a vessel. The apparatus is formed from a support structure having a chamber for housing at least LED. An outer surface of the support structure is sized and arranged to sealingly secure to the transom drain hole of a conventional boat to prevent water passage. The apparatus includes electrical connections extending through the end of the support structure for coupling to a power source. Illumination behind the boat is provided by an LED, halogen or other high intensity lighting source.

10 Claims, 3 Drawing Sheets

TRANSOM DRAIN LIGHT

FIELD OF THE INVENTION

This invention relates to the field of underwater lighting and, more particularly, to an underwater lighting device that mounts into a transom drain hole on a marine vessel.

BACKGROUND OF THE INVENTION

The use of underwater lights is well known in the art. Illumination from underwater lights attach fish providing better fishing opportunities and providing entertainment to those who enjoy watching marine life. More recently the industry has found various ways of mounting lights beneath the waterline on a marine vessel. Mounting of a light beneath the waterline requires that a hole be placed through the hull of a vessel and that proper sealing takes place to prevent water from penetrating the hull. Such lights are relatively expensive and requires professional installation.

Once installed, an underwater light provides countless hours of entertainment. Illumination also enhances the safety around the vessel, providing illumination to otherwise difficult to see low light level conditions.

All known lighting devices secured to a vessel hull are based on thru-hull fittings which makes them extremely expensive. The thru-hull fitting is a uniquely designed construction capable of preventing water entry yet provide an unobstructed window for passage of light from a halogen lamp, Light Emitting Diode (LED) or any other type of lighting element employed.

For instance, U.S. Pat. No. 7,044,623 discloses an underwater lighting device based on a specialty thru-hull vessel fitting. The fitting includes a flange placed on the outside of the vessel hull and an inner flange employing a jacking plate. The jacking plate is used to squeeze the hull between two flanges, a window panel is permanently with the outer flange. If the window panel is scratched, breached, or damaged, replacement of the entire thru-hull is required.

Thru-hull mounted underwater lights are expensive to manufacture and install, but also have inherent problems resulting from placement of multiple holes through the hull of a vessel. Larger vessels may have multiple lights placed in the transom of the vessel. If the vessel is left in the water, the underwater light is exposed to the elements at all times wherein growth can cover the light. Further, improper grounding can lead to galvanic action that, if left unchecked, is known to sink vessels.

Underwater lights for smaller vessels would provide the occupants with the same enjoyment received from placement on larger vessels, however, smaller boats may not have the space or hull thickness capable of supporting a transom mounted lighting device.

Thus, what is needed in the industry is an underwater light that can be installed in smaller marine vessels without the need for installing additional thru-hull fittings.

SUMMARY OF THE INVENTION

Disclosed is an underwater lighting apparatus securable in the transom drain hole of a marine vessel. The lighting apparatus replaces a conventional drain hole plug used to provide drainage of a marine vessel when the vessel is removed from water. The lighting apparatus is based on a support structure defined by a first end and a second end with a continuous side wall there between. An outer surface of the side wall is sized and arranged to sealingly secure to the transom drain hole. An inner surface of the side wall forms a chamber between the first end and the second end for housing at least one lamp electrically isolated from the support structure and preferably potted in the chamber.

The lamp may be a sealed lighting element such as a halogen lamp, an LED, or any other lighting element positioned along the first end of the chamber providing illumination outwardly therefrom. The electrical connections for the lighting element extend through a second end of the support structure to permit coupling to a power source such as a battery.

Placement of the light in the existing drain hole of a vessel eliminates the need for professional installation and allows a small vessel to receive the same enjoyment that underwater lighting provides to the large vessels. The light may include a shape to accommodates multiple LED and be of an ornamental design. The lighting device may include a drain hole and plug, thus allowing the LED or the like lighting device to remain in the transom drain hole yet provide a means for draining of water when the vessel is dry docked.

An objective of the instant invention is to provide a low cost underwater lighting apparatus that can be installed in the transom drain hole of a marine vessel.

Still another objective of the invention is to provide an underlight light that can be easily removed from a vessel to allow for drainage when the vessel is dry docked, as well as allow for cleaning, repair, or storage of the underwater light.

Yet still another objective of the invention is to teach the use of the transom drain hole as a support aperture for holding of lighting elements, such as a halogen, LED or other lighting element.

Still another objective of the instant invention is to teach the use of the transom drain hole as a conduit passageway allowing for the positioning of oversized lighting elements on the transom wall to a vessel hull.

Still another objective of the invention is to provide an underwater lighting apparatus that can be installed with the same fasteners used to install a drain hole plug.

Yet still another objective of the invention is to provide an underwater lighting apparatus that can be removed and replaced to vary color and/or intensity.

Another objective of the invention is to provide a support structure that is made of a material compatible with the existing drain hole to prevent galvanic reaction and permit sealing replacement of the existing drain hole plug.

Yet still another objective of the invention is to provide a lighting device for marine vessels powered by outboard motors, inboard/outboard motors, or even inboard motors wherein the lighting device allows for the viewing of the outboard motor propeller(s) in low level light conditions by placement through a transom drain hole.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DESCRIPTION OF THE PREFERRED EMBODIMENT(S)

Although the invention will be described in terms of a specific embodiment, it will be readily apparent to those skilled in this art that various modifications, rearrangements and substitutions can be made without departing from the spirit of the invention. The scope of the invention is defined by the claims appended hereto. For clarity of this specification, the embodiment described will detail the use of a lighting assembly for use in combination with the window housing of the instant invention.

Figure 1:
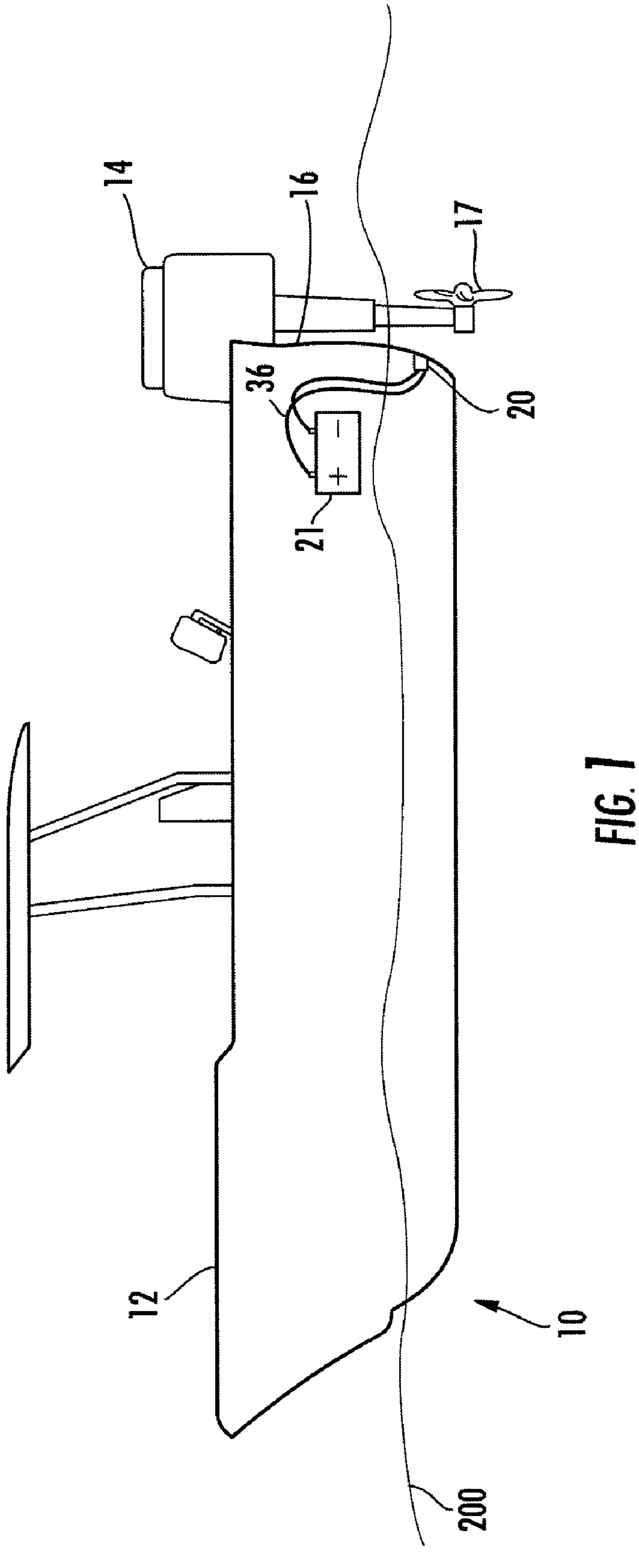
FIG. 1 is a pictorial view of a marine vessel with a transom drain light.

Referring to FIG. 1 set forth is a marine vessel (10) consisting of a vessel hull (12), and at least outboard engine (14) secured to a transom wall (16). A waterline (200) is depicted illustrating the placement of a propeller (16) submerged beneath the waterline (200). The transom drain light (20) of the instant invention is shown illuminating water from the rear of the transom (16). Preferably the power source for the transom drain light is a battery (21) electrically coupled to the lights by electrical wires (36). It should be noted that while the illustration depicts a boat having outboard engines, the invention is directed to any boat having a transom drain hole. This includes inboard/outboard powered boats, as well as inboard powered boat and jet boats.

Figure 2C:
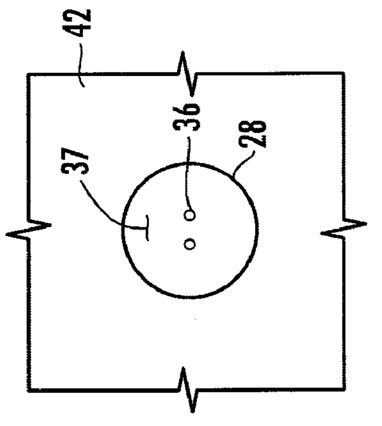
FIG. 2c is a rear view of the transom drain light depicted in FIG. 2b.
Figure 2B:
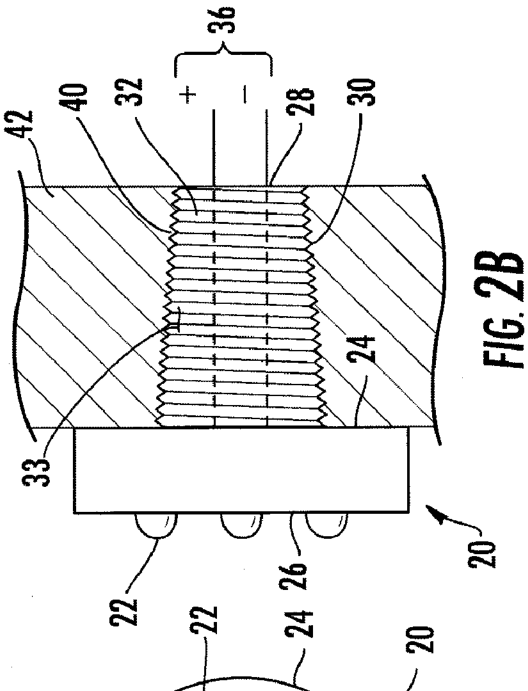
FIG. 2*b* is a cross sectional side view of a threaded transom drain light.
Figure 2A:
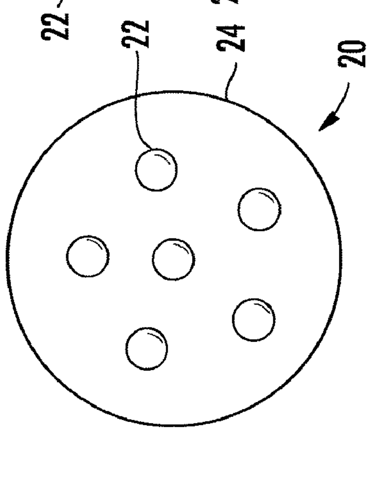
FIG. 2*a* is a front view of a transom drain light.

Now referring to FIG. 2a, 2b, and 2c shown is a first embodiment of the instant invention wherein the transom drain light (20) includes at least one light-emitting diode (LED) (22) mounted in a support structure (24). The support structure has a first end (26) and a second end (28) with a continuous side wall (30) formed therebetween. The support structure may be sized to hold a single LED or a plurality of LED's. The support structure (24) may be square, round, semi-round shape, or have an ornamental shape such as a fish, boat, tree and so forth.

An inner surface (32) of the side wall (30) forms a chamber 33 that operates as a passageway for the electrical wires(36). The electrical wires are potted 37 within the chamber 33 to prevent chafing and water passage. The wires are preferably potted 37 with an isolating material such as natural or synthetic elastomers, nitro rubber, fluoroelastomers, silicone, or plastic. The outer surface (30) of the side wall is sized to sealingly secure to the transom drain hole (40) of a marine vessel transom (42). In this embodiment the outer surface (30) includes tapered threads to eliminate the need for additional sealing materials wherein the use of threads create a water tight seal found on conventional threaded transom drain plugs. In operation power is supplied through the electrical wires(36) from a low voltage direct current source as provided by a conventional boat battery (21) in either 12 volt or 24 volt levels. The first end (24) may include a single LED and be sized the same as the outer surface (30) of the continuous side wall or, as shown, be enlarged so as to carry multiple LED's. The support structure (24) may be constructed from most any material but preferably made of either aluminum, stainless steal, titanium, bronze, brass, plastic, celcon or combinations thereof.

Figure 3C:
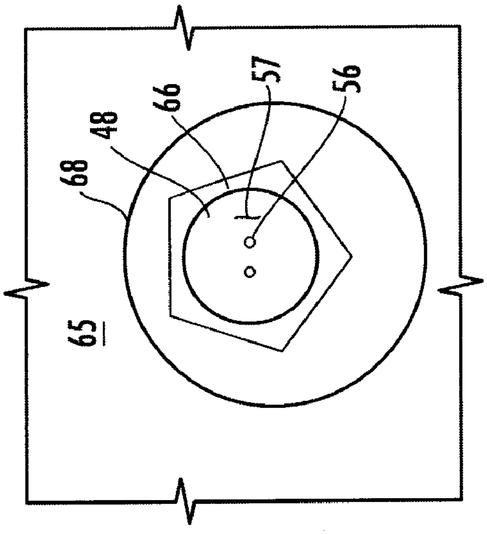
FIG. 3c is a rear view of FIG. 3b.
Figure 3B:
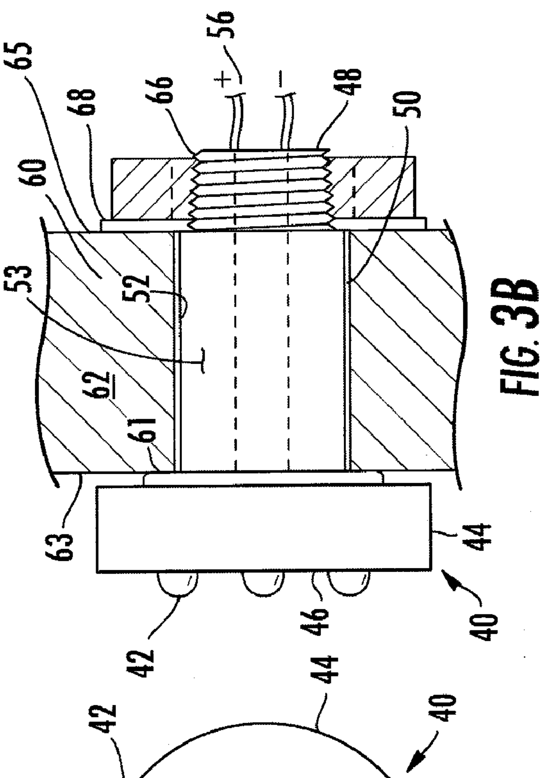
FIG. 3b depicts a second embodiment of a transom drain light that is bolted to a transom.
Figure 3A:
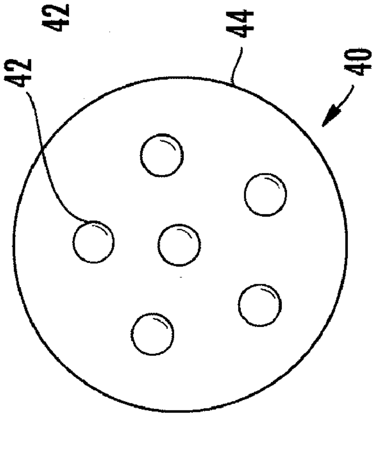
FIG. 3a is a front view of a second embodiment with a transom drain light.

Now referring to FIG. 3a, 3b, and 3c shown is a second embodiment of the instant invention wherein the transom drain light (40) includes at least one light-emitting diode (LED) (42) mounted in a support structure (44). The support structure has a first end (46) and a second end (48) with a continuous side wall (50) formed therebetween. The support structure (44) may be square, round, semi-round shape, or have an ornamental shape.

An inner surface (52) of the side wall (50) forms a chamber 53 that operates as a passageway for the electrical wires(56). The electrical wires are potted (57) within the chamber (53) to prevent chafing and water passage. The wires are preferably potted (57) with an isolating material as mentioned above. The outer surface of the side wall (50) is sized to sealingly secure to the transom drain hole (60) of a marine vessel transom (62). In this embodiment the outer surface (50) is smooth thus requiring first seal (61) between the support (46) and outer transom wall (63); and a second seal (68) adjacent to the inner transom wall (65).The second end of the light is treaded (66) and by use of an attachment nut (70), the light assembly is secured to the transom (62) sandwiching the transom(62) there between. In operation, power is supplied through the electrical wires (56) from a low voltage direct current source as provided by a conventional boat battery in either 12 volt or 24 volt levels. The first end (46) may include a single LED and be sized the same as the outer surface (50) of the continuous side wall or, as shown, be enlarged so as to carry multiple LED's. The support structure (44) may be constructed from most any material but preferably made of either aluminum, stainless steal, titanium, bronze, brass or combinations thereof.

Figure 4C:
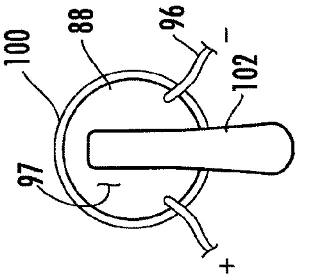
FIG. 4c is a rear view of FIG. 4b.
Figure 4B:
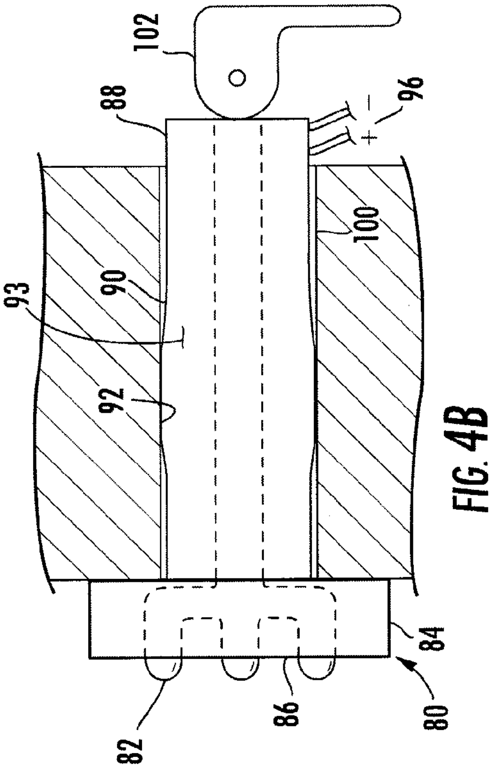
FIG. 4b is a cross sectional side view of a third embodiment of a transom drain light having an expandable seal.
Figure 4A:
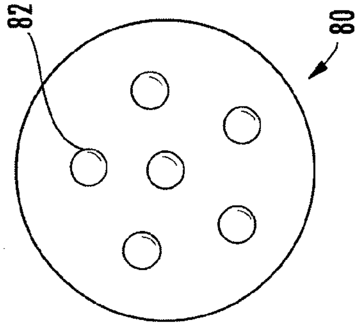
FIG. 4a is a third embodiment of a transom drain light.

Now referring to FIG. 4a, 4b, and 4c shown is a third embodiment of the instant invention wherein the transom drain light (80) includes at least one light-emitting diode (LED) (82) mounted in a support structure (84). The support structure has a first end (86) and a second end (88) with a flexible side wall (90) formed therebetween. The support structure (84) may be square, round, semi-round shape, or have an ornamental shape.

An inner surface (92) of the side wall (90) forms a chamber (93) that operates as a passageway for the electrical wires(96). The electrical wires are sealed (97)within the chamber (93) to prevent chafing and water passage. The outer surface of the side wall (90) is made of a flexible material, such as neoprene, that is sized to sealingly secure to the transom drain hole (100) of a marine vessel transom (62). In this embodiment the outer surface side wall (90) engages the drain hole by use of a means for expanding such as a conventional flip handle style tightening lever 102 or threaded t-handle .

In operation, power is supplied through the electrical wires (96) from a low voltage direct current source as provided by a conventional boat battery in either 12 volt or 24 volt levels. The first end (86) may include a single LED and be sized the same as the outer surface (90) of the continuous side wall or, as shown, be enlarged so as to carry multiple LED's. The support structure (84) may be constructed from most any material but preferably made of either aluminum, stainless steal, titanium, bronze, brass or combinations thereof.

Figure 5:
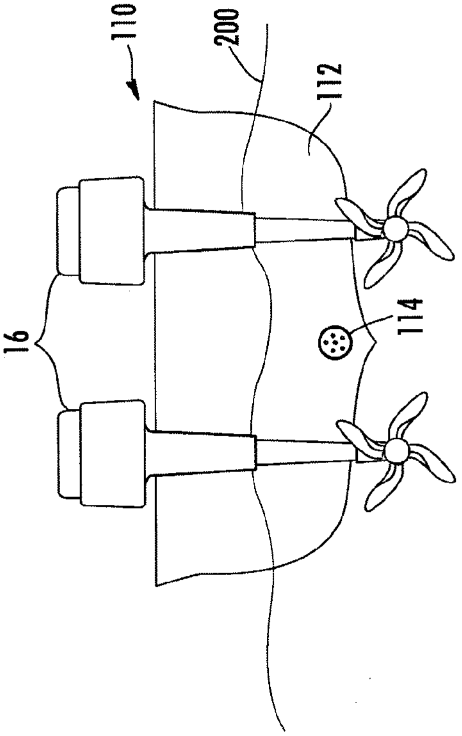
FIG. 5c is a rear pictorial view of a marine vessel having a transom drain light of the first embodiment installed.

Now referring to FIG. 5 shown is a pictorial transom view of a marine vessel (10) having a transom (20) and engines (16). This configuration the engines are shown in duplex and the vessel (110) is partially submerged beneath the waterline (200). The transom drain light (20) is located in a area that has little or no pressure and ideally suited to allow illumination of items behind the vessel as well as propeller conditions when operating in low illumination situations.

Figure 6:
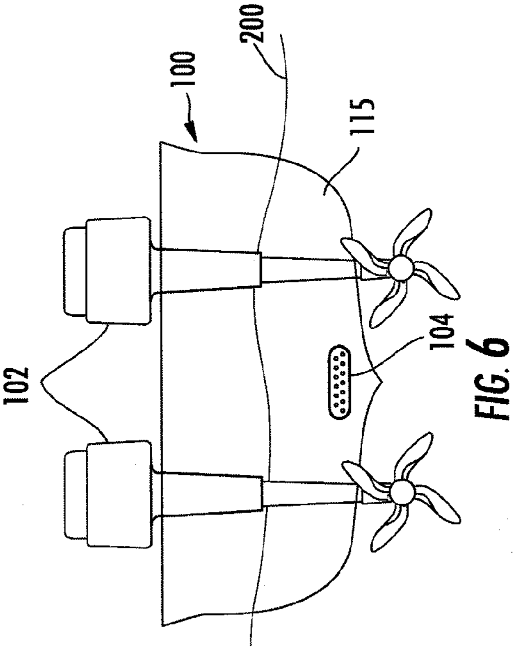
FIG. 6 is a pictorial rear view of a elongated transom drain light.

Now referring to FIG. 6 shown is a transom pictorial view showing a vessel (100) having engines blown up to duplex with a transom drain light (104) which is elongated and may be further secured to a transom by a single tap screw so as to prevent rotation of the light once positioned. As with the previous embodiments the vessel illuminates beneath the waterline (200) but with greater intensity by use of multiple LED's. Alternatively, the illumination source may be a Halogen light, strobe, fiber optic or high intensity discharge (HID) lights.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown in the drawings and described in the specification.

What is claimed is:

1. An underwater lighting apparatus securable in a marine vessel having a transom drain hole positioned beneath the waterline comprising a removable drain plug and a fixed drain hole fitting configured to sealingly receive said removable drain plug, said apparatus comprising;

a support structure having a first end and a second end with a continuous side wall there between, an inner surface of said continuous side wall forming a chamber, an outer surface of said continuous side wall sized and arranged to sealingly secure to said transom drain hole fitting;

at least one lighting element disposed in said chamber, said lighting element having an illumination end positioned along a first end of said chamber and electrical connections extending from said lighting element through a second end of said chamber; and a power source electrically coupled to said electrical connections;

wherein the removal of the drain plug allows the temporary placement of said support structure into said transom drain hole fitting which permits illumination of items behind the transom when said power source is energized.

2. The underwater lighting apparatus of claim 1 wherein said support structure is electrically isolated from said marine vessel.

3. The underwater lighting apparatus of claim 1 wherein said outer surface of said side wall has tapered threads.

4. The underwater lighting apparatus of claim 1 wherein said first end of said support structure includes a lamp support bracket for holding a plurality of lighting elements.

5. The underwater lighting apparatus according to claim 1 wherein said support structure is constructed from a material selected from the group consisting of aluminum, stainless steel, titanium, bronze, plastic or combinations thereof.

6. The underwater lighting apparatus according to claim 1 wherein said lighting element is at least one low voltage LED.

7. The underwater lighting apparatus according to claim 1 wherein said lighting element is a halogen lamp.

8. The underwater lighting apparatus according to claim 1, wherein said electrical element is potted with an electrical isolating material selected from the group consisting of natural or synthetic elastomers, nitrile rubber, fluoroelastomers, silicone, or plastic.

9. The underwater lighting apparatus according to claim 1, wherein said support structure include a drain hole allowing water to drain from said marine vessel when said support structure is placed within said transom drain hole fitting.

10. The underwater lighting apparatus of claim 1 wherein said outer surface of said side wall is flexible having a means for expanding adapted for sealing said support structure to said transom drain fitting.

* * * * *